United States Patent
Baldi et al.

(10) Patent No.: US 7,141,111 B2
(45) Date of Patent: Nov. 28, 2006

(54) EMBEDDED PIGMENTS FOR CERAMIC PRODUCTS AND OXIDES IN THE FORM OF NANOMETRIC PARTICLES

(75) Inventors: Giovanni Baldi, Montespertoli (IT); Andrea Barzanti, Empoli (IT); Marco Bitossi, Montelupo Fiorentino (IT)

(73) Assignee: Colorobbia Italia S.P.A. (IT)

( * ) Notice: Subject to any disclaimer, the term of this patent is extended or adjusted under 35 U.S.C. 154(b) by 0 days.

(21) Appl. No.: 10/506,983

(22) PCT Filed: Mar. 6, 2003

(86) PCT No.: PCT/EP03/02282

§ 371 (c)(1), (2), (4) Date: Sep. 7, 2004

(87) PCT Pub. No.: WO03/076525

PCT Pub. Date: Sep. 18, 2003

(65) Prior Publication Data

US 2005/0126440 A1 Jun. 16, 2005

(30) Foreign Application Priority Data

Mar. 8, 2002 (IT) .............................. FI02A0039

(51) Int. Cl.
- *C04B 14/00* (2006.01)
- *C09C 1/04* (2006.01)
- *C09C 1/10* (2006.01)
- *C08K 3/00* (2006.01)

(52) U.S. Cl. .............. 106/401; 428/404; 106/425; 106/436; 106/450; 106/452; 106/459; 106/479; 106/482

(58) Field of Classification Search ........... 106/401, 106/425, 436, 450, 452, 459, 479, 482; 428/404
See application file for complete search history.

(56) References Cited

U.S. PATENT DOCUMENTS

| | | | | |
|---|---|---|---|---|
| 4,605,594 A | * | 8/1986 | Owens et al. ............... | 428/373 |
| 5,112,403 A | * | 5/1992 | Okura et al. ................ | 106/418 |
| 5,618,343 A | * | 4/1997 | Hendi et al. ................ | 106/498 |
| 5,997,627 A | * | 12/1999 | Babler ........................ | 106/493 |
| 6,136,083 A | | 10/2000 | Schmidt et al. | |
| 6,521,016 B1 | * | 2/2003 | Kim et al. .................... | 75/351 |
| 6,565,973 B1 | * | 5/2003 | Duff et al. .................. | 428/402 |
| 6,582,764 B1 | * | 6/2003 | Fuller et al. ................ | 427/217 |

FOREIGN PATENT DOCUMENTS

| JP | 362253176 A | * | 11/1987 |
|---|---|---|---|
| WO | WO 01/60628 A2 | | 8/2001 |
| WO | WO 02/40600 A1 | | 5/2002 |

OTHER PUBLICATIONS

Claus Feldmann; "Preparation of Nanoscale Pigment Particles"; Advanced Material; Sep. 3, 2001; pp. 1301-1303.

Claus Feldmann and Hans-Otto Jungk; "Polyol-Mediated Preparation of Nanoscale Oxide Particles"; Angew. Chem. Intl; 2001; pp. 359-362.

Jacqueline Merikhi, Hans-Otto Jungk and Claus Feldmann; "Submicrometer CoAL2o4 Pigment Particles—Synthesis and Preparation of Coatings"; The Royal Society of Chemistry; 2000; pp. 1311-1314.

* cited by examiner

*Primary Examiner*—J. A. Lorengo
*Assistant Examiner*—Jennine Brown
(74) *Attorney, Agent, or Firm*—Stetina Brunda Garred & Brucker

(57) ABSTRACT

Described herein are embedded pigments consisting of a labile chromophore englobed in a coating of refractory and transparent material formed by nanomolecular particles, also described are oxides of refractory and transparent materials in the form of nanoparticles and their use for coating labile chromophores or ceramic surfaces.

17 Claims, No Drawings

EMBEDDED PIGMENTS FOR CERAMIC PRODUCTS AND OXIDES IN THE FORM OF NANOMETRIC PARTICLES

FIELD OF THE INVENTION

The present invention relates to embedded pigments used for the colouring of ceramic products and to oxides of refractory and transparent materials in the form of nanometric particles.

STATE OF THE ART

As is known, ceramic colorants that are applied on a base and then subjected to firing are required to meet particular criteria of brilliancy and of conservation of tonality and moreover must have a particular structure and composition, for example for guaranteeing their stability at high temperatures, to which they are subjected during the steps of production of the end products.

Should the chromophore elements responsible for the colour, which are normally oxides or non-oxides as cadmium sulphide and cadmium sulpho selenide, be thermolabile substances, their use as such in the ceramic field is practically ruled out or limited at low application temperatures.

A possible solution would be that of protecting said labile chromophores by englobing them in a refractory component capable of protecting them in the conditions of application and of enabling them to maintain their chromatic characteristics and therefore develop the desired colouring.

However, the preparation of said protected pigments (hereinafter defined as "embedded pigments") presents considerable difficulties.

Up to the present day the only pigment of this type known is Cd(S,Se) englobed in zirconium silicate with formula $ZrSiO_4$: Cd(S,Se).

The above pigment is produced with a traditional process of thermal treatment of raw materials at high temperatures, in which there is applied a certain overpressure to prevent decomposition of the labile species.

In practice, in special sealed muffle furnaces $CdCO_3+S+Se+ZrO_2+SiO_2$ are made to react at high temperatures in the presence of mineralizing agents, in general fluorine compounds. (An alternative process envisages synthesis with sulphites.)

The overpressure that is a created inside the special furnace prevents the decomposition of the cadmium sulphoselenide Cd(S,Se) that has formed. In this way, the zirconium silicate manages to encapsulate the thermolabile chromophore, enabling the use of the pigment that has thus been formed even in conditions of high temperatures and in environments that are particularly aggressive.

In practice, then, crystals of cadmium sulphoselenide are thus embedded in crystals of $ZrSiO_4$ that have formed in the solid state.

On the other hand, in the literature (see, for example, Claus Feldman, "Preparation of Nanoscale Pigment Particles", Adv. Mater. 2001, 13, No. 17, September 3, pp. 1301–1303; Claus Feldman et al., "Polyol-Mediated Preparation of Nanoscale Oxide Particles" Angew. Chem. Int. Ed., 2001, 40, No. 2, pp. 359–362, and Jacqueline Merikhi et al. "Sub-micrometer $CoAl_2O_4$ pigment particles—synthesis and preparation of coatings", J. Mater. Chem. 2000, 10, pp. 1311–1314), there are described inorganic substances containing metal oxides in the form of particles of nanometric dimensions. In particular, there are described suspensions of particles of $CoAl_2O_4$, $TiO_2$, $ZnCo_2O_4$, $Ta_2O_5$, $Fe_2ONb_2O_5$, CoO, ZnO, $Cu_2O$, $Cr_2O_3$, $Ti_{0.85}Ni_{0.05}Nb_{0.10}O_2$, Cu(Cr,Fe)$O_4$, in addition to metals of the type: $Sn^0$, $Fe^0$, $Ru^0$, $Au^0$, $Co^0$, $Ni^0$; and Ni—Co, $Ag^0$, $Pd^0$, $Rh^0$, $Pt^0$, alloys having nanometric dimensions. However, no indication regarding their use as ceramic colorants for the decoration of stoneware or ceramic glazes appears in the aforesaid documents. In this connection, it should be noted that the aforesaid products cannot be used for preparing the embedded pigments as described above or, in any case, for constituting protective layers on ceramic materials.

Moreover, in the parallel patent in the name of the present applicant there have been described colorants, amongst which chromophore oxides, for ceramic products or textile products, consisting of particles having nanometric dimensions in the form of suspensions or powders.

It is obvious, in the light of what has, been said, how important it would be to have available pigments that enable exploitation of the colouring capacities of thermolabile chromophores.

DETAILED DESCRIPTION OF THE INVENTION

The present invention enables all of the problems referred to above to be overcome thanks to embedded pigments consisting of a labile chromophore embedded in a shell (coating) of refractory and transparent material consisting of aggregate nanoparticles (clusters), which adhere to the surface of the labile chromophore.

According to the invention the labile chromophore may, in turn, assume the form of nanometric particles or else crystals of dimensions ranging between approximately 1 μm and 15 μm.

By the term "nanometric particles", according to the invention, are meant particles having a mean diameter comprised between 5 nm and 600 nm.

Labile chromophore compounds according to the invention are all those compounds that are decomposed under the action of heat:, an oxidizing atmosphere, or in the presence of melted substances, such as in the case of application in glasses or glazes. In particular, the following should be recalled: cadmium sulphoselenide; red hematite $Fe_2O_3$, which dissolves in a glass or in a an enamel yielding the colour of the brown chromophore $Fe^{3+}$; wolframium bronzes $M^I_n WO_3$, where $M^I$ is an alkaline metal and $0.1 < n < 0.95$, which have colours that range from red to dark blue according to the value of n; or molybdenum blues $MoO_x(OH)_y$ (where x=2, and y=1; or x=2.5, and y=0.5). Refractory and transparent materials in the form of nanoparticles, according to the is invention, capable of protecting labile chromophores or to be applied as such on other materials as hereinafter specified, are for example:

$ZrO_2$, $Al_2O_3$, $SnO_2$, $ZrSiO_4$, $SiO_2$, $TiO_2$, $CeO_2$ and ZnO.

In addition to what has been said previously, according to a particular embodiment of the invention, the refractory and transparent materials in the form of nanoparticles as defined above may be used just as they are for coating ceramic materials in order to improve ceramic surfaces from the aesthetic point of view and/or from the chemico-physical point of view.

Embedded pigments according to the present invention are thus constituted by a thermolabile chromophore (as defined above) coated with a coating made up of nanoparticles of transparent refractory oxides (as defined previously).

In particular, embedded pigments according to the invention are ones chosen in the group consisting of:

$ZrSiO_4$: $Fe_2O$, $ZrSiO_4$: $Cd(S,Se)$, $ZrO_2$: $Cd(S,Se)$, $SiO_2$: $Cd(S,Se)$, $Al_2O_3$: $Cd(S,Se)$, $Al_2O_3$: $Fe_2O_3$, $SnO_2$: $Fe_2O_3$, $SnO_2$: $Cd(S,Se)$, $SiO_2$: $MoO_x(OH)_y$, $Al_2O_3$: $MoO_x(OH)_y$, $SnO_2$: $MoO_x(OH)_y$, $ZrO_2$: $MoO_x(OH)_y$, $ZrSiO_4$: $MoO_x(OH)_y$ (where x=2, and y=1; or x=2.5, and y=0.5), $SiO_2$: $M_nWO_3$, $Al_2O_3$: $M_nWO_3$, $SnO_2$: $M_nWO_3$, $ZrO_2$: $M_nWO_3$, $ZrSiO_4$: $M_nWO_3$ (where 0.1<n<0.95, and M is chosen in the group consisting of Na, K, Li, Ca, Sr, Ba, Cu, Zn, Cd, In, Sn, La).

The embedded pigments according to the invention may be prepared using the known processes as described in the above-mentioned patent application.

In particular, it is possible to use the polyol process, which is widely described in the literature.

In brief, the process consists in the use of a high-boiling alcohol, which makes it possible to work at high temperatures and to complex the particles being formed, so preventing their growth.

Normally, the process is to add to a known volume of alcohol (for example, DEG) the salts (preferably acetates, carbonates, sulphates, oxalates, chlorides) of the desired metals. The solution is then heated and is simultaneously kept under stirring up to complete solubilization of the salts. Water is added in the desired amount for facilitating hydrolysis of the salts (which leads to the formation of the corresponding oxides), and the solution is then heated up to a temperature that depends upon the pigment that is to be prepared and is, in any case, higher than 120° C.

The alcohol not only facilitates the formation of the oxides but, thanks to its complexing capacity, prevents the growth of the particles.

More In particular, as regards the embedded pigments according to the invention, in which the labile chromophore is in the form of nanometric particles, there are obtained first the nanometric particles of labile chromophore, upon which there are then superimposed the nanometric particles of refractory transparent material, as illustrated in the examples provided in what follows.

Should, instead, the chromophore be in the form of a crystal, this will be prepared in a traditional way and will then be englobed in the cluster of nanometric particles of transparent refractory material that will be deposited thereon.

After remaining for a period at a high temperature, which varies from system to system, there is obtained a suspension which, once left to cool down to room temperature, is used just as it is or else centrifuged and dried.

Once dried, the powder thus obtained is applied in the usual ways in ceramic bodies or in enamels, or else is calcined in a rapid cycle with times that range generally from 1 to 6 hours at a temperature of between 400° C. and 1200° C. so as to obtain the pigment proper.

The processes described in the examples may be summed up in the following illustrative diagram:

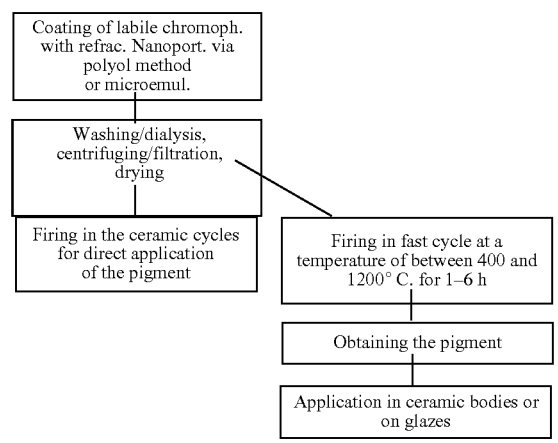

DIAGRAM

In particular the microemulsion technique consists in preparing a dispersed phase (for example water) in a main phase (for example a solvent like n-hexane) using a tensioactive which can be ionic, non-ionic or anionic.

By regulating appropriately the quantities of the above said three components, water droplets mono dispersed in the solvent are obtained.

Pouring in a reactor micro-emulsions containing two or more reagents and letting them react (for example under the action of stirring, ultrasounds, etc.) by fusion of the respective droplets, various complexes can be obtained.

Provided hereinafter are some examples of preparation of oxides and embedded pigments according to the invention. For each example, two different methods of preparation are described.

EXAMPLE 1

Preparation of the Transparent Refractory Material

Reagents:

9.22 g. of $ZrOCl_2 \times 8H_2O$ 100 cc of DEG (diethylenglycol)

Synthesis 100 cm³ of DEG and the indicated quantity of $ZrOCl_2$ are poured in three necked reactor equipped with stirrer, reflux refrigerator and termometer. The suspension is stirred and heated until the reagents are completely solved Thereafter the solution is heated up to 170° C.; the solution becomes immediately opalescent and is left under vigorous stirring for 1 hour at 170° C.

Finally the solution is cooled down and a transparent solution of $ZrO_2$ is obtained.

EXAMPLE 2

Reagents:

6.04 g. of $Zn(CH_3COO)_2 \times 2H_2O$ 200 cc of DEG (diethylenglycol)

Synthesis 200 cm³ of DEG and the indicated quantity of $Zn(CH_3COO)_2$ are poured in three necked reactor equipped with stirrer, reflux refrigerator and termometer. The suspension is stirred and heated until the reagents are completely solved Thereafter the solution is heated up to 160° C., 0.4 g. of deionised water are added to help the hydrolysis. The solution becomes immediately opalescent and is cooled down giving a solution of ZnO.

EXAMPLE 3

Phase I

Reagents
71.60 cc of $Ti[OCH(CH_3)_2]_4$
71.42 cc of DEG (diethylen glycol)

Synthesis 71.42 cm³ of DEG are poured in a four necked reactor equipped with a stirrer, a Liebig's refrigerator a thermometer and dropping funnel and heated up to 140° C. 71.60 cm³ of titanium isopropoxy derivative are dropped slowly in the solution. Since white vapours of $TiO_2$ develop because of the violent decomposition of the alkoxy derivative, it is better to work in nitrogen current.

When the alkoxy derivative contacts the DEG it decompose, the forming isopropyl alcohol is distilled away.

The solution is cooled down and a viscous, yellow product is collected (such product is still reactive but less reactive than the starting alkoxy derivative).

Phase II

Reagents:
25.00 cc of phase I product
100 cc of DEG (diethylen glycol)
20 cc $H_2O$ (deionised)
30 cc Acetic acid 80%

Synthesis 100 cc of DEG, 20 cc of deionised $H_2O$ and 30 cc of acetic acid are poured in a three necked reactor equipped with stirrer, thermometer and reflux refrigerator. The mixture is heated up to about 60° C., thereafter 25 cc of the product collected at the end of Phase I is added with a peristaltic pump, the addition must be done very slowly in order to allow the solution of the product as soon as it contacts the DEG. The pipe of the peristaltic pump must be immersed in the solution (acting as described the formation of lumps is avoided).

The mixture is heated up to reflux (about 120° C.) and left at such temperature for 30 minutes, a yellow solution of $TiO_2$ is obtained, which can be diluted in water.

EXAMPLE 4

10 g of CdSSe in crystals are suspended in 100 cc of DEG (diethylene glycol). There are added 2.65 g of $Zr(CH_3COO)_4$ and 2 cc of $H_2O$ at room temperature, and then the solution is heated to 120° C.

It is left under stirring under reflux for 2 h, and then the temperature is raised to 180° C., and it is left at this temperature for 4 h.

After cooling to room temperature, there is obtained a red suspension consisting of Cd(S,Se) with a coating of $ZrO_2$. The suspension is filtered, and the material is dried to obtain the red pigment of Cd(S,Se) embedded in $ZrO_2$, which can be formalized as $ZrO_2$:Cd(S,Se).

The material is washed with an appropriate solvent, in general water, filtered and dried.

EXAMPLE 5

10 g of Cd(S,Se) in crystal form are suspended in 100 cc of DEG (diethylene glycol).

There are then added at room temperature 3.22 g of $ZrOCl_2 \times 8H_2O$, and 2.08 cc of TEOS (tetraethyl orthosilicate), and then 2 cc of $H_2O$. The solution is heated to 120° C. It is left under stirring under reflux for 30 minutes, and then the temperature is raised to 180° C., and the solution is left at this temperature for 4 h.

After cooling to room temperature, there is obtained a red suspension consisting of Cd(S,Se) with a coating of nanometic particles of $ZrSiO_4$. The suspension is filtered, and the material is dried to obtain the red pigment of Cd(S,Se) embedded in $ZrSiO_4$, which can be formalized as $ZrSiO_4$: Cd(S,Se).

EXAMPLE 6

10 g of $Na_nWO_3$, where n=0.9, are suspended in 100 cc of DEG (diethylene glycol). There are then added 3.05 g of $Al(CH_3COO)_2OH$ and 2.2 cc of $H_2O$ at room temperature, and then the solution is heated to 130° C.

It is left under stirring under reflux for 2.5 h, and then the temperature is raised to 180° C., and it is left at this temperature for 3 hours.

After cooling to room temperature, there is obtained a red suspension consisting of $Na_nWO_3$, where n=0.9 with a coating of $Al_2O_3$.

The suspension is filtered, and the material is dried to obtain the blue pigment of $Na_nWO_3$, where n=0.9, embedded in $Al_2O_3$, which may be formalized as $Al_2O_3$: $Na_nWO_3$, where n=0.9.

The suspensions of the embedded pigments obtained according to the examples given above are then subjected to a washing or dialysis, centrifuging or filtration and drying, as mentioned previously.

The suspensions according to Example 1 can be applied on a porcelain-stoneware substrate unfired or else fired in such a way as to fill in the porosities with the oxide and improve its surface mechanical properties (e.g., resistance to abrasion) and absorption of $H_2O$.

Alternatively, the suspensions of Example 1 may be applied on substrates of non-ceramic materials (plastics, metals) so that thermal treatments at low temperature will enable the formation of a layer of $ZrO_2$ or $TiO_2$.

The pigments obtained from Examples 2, 3 and 4 can be used for ceramic applications at high temperatures (>1200° C.), as compared to ones that can be used with the pigment Cd(S,Se), lower than 1000° C., since the coating bestows a greater refractoriness on the pigment, which, during the firing operations in an oxidizing atmosphere in ceramic applications, is decomposed easily.

All the suspensions described can also be used for ennobling glazes with good aesthetic characteristics but with poor resistance to acid or alkaline attack, or with poor resistance to wear.

The suspensions can be used in textile applications, both for instance using the technique of impregnation of the fibre and that of spreading with an adequate thickening means according to the specific chemico-physical characteristics of the material. Moreover the suspension can be used in the cosmetic filed.

In addition to the better mechanics characteristics which are imparted by the suspension is should be noted that $TiO_2$ show anti-bacteria and anti-UV properties, ZnO suspensions can be used as anti UV in textiles and solar creams, $ZrO_2$ suspension act as anti-flame for textiles and improve the resistance of ceramic products.

The suspensions can be used also in the catalysts field by impregnating appropriate porous substrates (for example ceramic) or, once reduced to powders, for moulding catalysts.

The described suspensions can be also used as fillers in the production of plastic or rubber-materials; for example the refractory and transparent oxides described above can be used in the production of UV-resistant transparent plastic or rubber-materials.

The invention claimed is:

1. Encapsulated pigments consisting of:
    a labile chromophore defining a surface; and
    a plurality of nanoparticles being fabricated from a refractory and transparent inorganic material, the nanoparticles adhering to the surface of the labile chromophore to form a shell thereabout with the labile chromophore being embedded within the shell.

2. The pigments according to claim 1, wherein the labile chromophore is the size of a nanometric particle.

3. The pigments according to claim 1, wherein the labile chromophore is in crystal form.

4. The pigments according to claim 1, wherein the labile chromophore is chosen in the group consisting of: cadmium sulphoselenide; hematite ($Fe_2O_3$); wolframium bronzes $M_{I_n}WO_3$, wherein $M^I$ is an alkaline metal and $0.1<n<0.95$ and molybdenum blues $MoO_x(OH)_y$, wherein when $x=2$, $y=1$, and wherein when $x=2.5$, $y=0.5$.

5. The pigments according to claim 1, wherein the shell consists of nanoparticles of oxides selected from the group consisting of: $ZrO_2$; $Al_2O_3$; $SnO_2$; $ZrSiO_4$; $SiO_2$; $TiO_2$; $CeO_2$; and ZnO.

6. The pigments according to claim 1 wherein the plurality of nanoparticles and the labile chromophore are selected according to an A':B' pairing, with A' being representative of the plurality of nanoparticles and B' being representative of the labile chromophore, the A':B' pairing being selected from the group consisting of:
    $ZrSiO_4$: $Fe_2O_3$;
    $ZrSiO_4$: Cd(S,Se);
    $ZrO_2$: Cd(S,Se);
    $SiO_2$: Cd(S,Se);
    $Al_2O_3$: Cd(S,Se);,
    $Al_2O_3$: $Fe_2O_3$;
    $SnO_2$: $Fe_2O_3$;
    $SnO_2$: Cd(S,Se);
    $SiO_2$: $MoO_x(OH)_y$;
    $Al_2O_3$: $MoO_x(OH)_y$;
    $SnO_2$: $MoO_x(OH)_y$;
    $ZrO_2$: $MoO_x(OH)_y$;
    $ZrSiO_4$: $MoO_x(OH)_y$;
    $SiO_2$: $M_n WO_3$;
    $Al_2O_3$: $M_n WO_3$;
    $SnO_2$: $M_n WO_3$;
    $ZrO_2$: $M_n WO_3$;
    $ZrSiO_4$: $M_n WO_3$;
    wherein x is equal to either 2 or 2.5 and y is equal to 1 or 0.5, and when $x=2$, $y=1$, and when $x=2.5$, $y=0.5$; and wherein $0.1<n<0.95$, and wherein M is selected from the group consisting of Na, K, Li, Ca, Sr, Ba, Cu, Zn, Cd, In, Sn, and La.

7. Pigments according to claim 1 for use in the catalysts, cosmetic and in the plastic-, rubber-materials industry.

8. A process for the preparation of encapsulated pigments, the encapsulated pigments including a labile chromophore and a plurality of nanoparticles, the nanoparticles adhering to a surface of the labile chromophore to form a shell thereabout with the labile chromophore being embedded within the shell, the plurality of nanoparticles being fabricated from a refractory and transparent material, the process comprising the steps of:
    adding salts of desired metals to a known volume of alcohol to form a suspension;
    heating the suspension under stirring up to complete solubilization of the salts;
    adding water to the suspension for facilitating hydrolysis of the salts;
    heating the suspension to a temperature higher than 150° C. for furthering the hydrolysis; and
    cooling the suspension to room temperature once the hydrolysis reaction is completed;
    collecting a precipitate of the encapsulated pigments; and
    washing and drying the precipitate of the encapsulated pigments.

9. The process of claim 8 wherein the labile chromophore is the size of a nanometric particle, and wherein the labile chromophore is prepared with the plurality of nanoparticles being subsequently superimposed thereon.

10. The process of claim 8 wherein the labile chromophore is prepared in the form of a crystal with the nanoparticles being deposited on the surface of the labile chromophore.

11. The process of claim 8 wherein the plurality of nanoparticles are fabricated from a refractory and transparent oxide selected from the group consisting of: $ZrO_2$; $Al_2O_3$; $SnO_2$; $ZrSiO_4$; $SiO_2$; $TiO_2$; $CeO_2$; and ZnO.

12. The process of claim 11 further including the step of utilizing the oxide in the textile field.

13. The process of claim 11 further including the step of utilizing the oxide in the catalyst, cosmetic and in the plastic-, rubber-materials industry.

14. The process of claim 8 further including the step of applying the encapsulated pigments to a ceramic body.

15. The process of claim 8 further including the step of applying the encapsulated pigments to a textile article.

16. The process of claim 11 further including the step of coating at least one surface of a porcelain stoneware body.

17. The process of claim 11 further including the step of coating a non-ceramic substrates.

* * * * *